(12) United States Patent
Greb et al.

(10) Patent No.: US 8,052,562 B2
(45) Date of Patent: Nov. 8, 2011

(54) TRANSMISSION FOR COUPLING A STARTER-GENERATOR ELECTRICAL MACHINE TO AN INTERNAL COMBUSTION ENGINE

(75) Inventors: Peter Greb, Otterswier (DE); Oswald Friedmann, Lichtenau (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 899 days.

(21) Appl. No.: 11/893,592

(22) Filed: Aug. 16, 2007

(65) Prior Publication Data

US 2008/0045367 A1 Feb. 21, 2008

(30) Foreign Application Priority Data

Aug. 17, 2006 (DE) .......................... 10 2006 038 569

(51) Int. Cl.
*F16H 3/72* (2006.01)
(52) U.S. Cl. ............................. 475/5; 188/171; 180/53.5
(58) Field of Classification Search .................... 475/5; 180/53.5–53.8; 188/170, 171
See application file for complete search history.

(56) References Cited

U.S. PATENT DOCUMENTS

| 4,606,444 A * | 8/1986 | Sekella .......................... 188/171 |
| 6,612,959 B2 * | 9/2003 | Frost .............................. 475/288 |
| 7,028,794 B2 * | 4/2006 | Odahara et al. .................... 475/5 |

* cited by examiner

*Primary Examiner* — David D Le
*Assistant Examiner* — Derek D Knight
(74) *Attorney, Agent, or Firm* — Alfred J. Mangels

(57) ABSTRACT

A transmission for coupling a starter-generator electrical machine to an internal combustion engine and having a transmission ratio that is a function of the rotational speed of the internal combustion engine. The ratio of the rotational speed of the electrical machine to that of the internal combustion engine can be increased at a lower rotational speed of the internal combustion engine than at a higher rotational speed of the internal combustion engine. A control device is provided for switching the transmission ratio, which is held by means of spring force in a condition in which the ratio of rotational speeds is high, and as the rotational speed of the internal combustion engine rises increases the transmission ratio is switched to a condition in which the ratio of rotational speeds is lower.

9 Claims, 3 Drawing Sheets

TRANSMISSION FOR COUPLING A STARTER-GENERATOR ELECTRICAL MACHINE TO AN INTERNAL COMBUSTION ENGINE

BACKGROUND OF THE INVENTION

1. Field of the Invention

The present invention relates to a transmission for coupling a starter-generator electrical machine to an internal combustion engine in a way to assure satisfactory functional reliability of transmission of torque even when the electrical power fails.

2. Description of the Related Art

In modern motor vehicles, increasing use is being made of electrical machines, which are usable both for starting the internal combustion engine and as generators for charging the battery during certain operating conditions. The starter function can be used additionally to supply additional starting torque in certain operating conditions. With the generator function it is possible to recover energy when braking the vehicle, for example, or to recharge the battery during certain operating conditions. Thus the electrical machine serves both to improve driving convenience and to reduce fuel consumption.

For coupling between the electrical machine and the internal combustion engine, a transmission is provided that operates at a high transmission ratio between the rotational speed of the electrical machine and the rotational speed of the internal combustion engine when the internal combustion engine is running at low rotational speeds, and with a low transmission ratio when the internal combustion engine is running at high rotational speeds. The result is that the electrical machine supplies sufficient electrical energy at low rotational speeds of the internal combustion engine and that sufficient torque is available for starting the internal combustion engine. The lower transmission ratio ensures that the electrical machine does not overspeed at high rotational speeds of the internal combustion engine.

A transmission ratio control device is normally actuated by centrifugal force, so that the system operates with a high transmission ratio at low rotational speeds. With a good battery charge even the low transmission ratio is sufficient, since the battery does not have to be charged and lower driving losses occur for the electrical machine. It therefore makes sense with regard to energy to actively switch over the transmission ratio in accordance with need.

Active switching results in a conflict of objectives for functional reliability when the electrical power fails. If the control system operates so that a low transmission ratio continues in effect when the electrical power fails, it can no longer be possible to start the internal combustion engine, since there is not sufficient torque available.

If the control is instead operated so that a high transmission ratio remains in effect when the electrical power fails, the electrical machine overspeeds at high crankshaft rotational speeds and is destroyed.

An object of the present invention is to further develop an appropriate type of transmission such that satisfactory functional reliability is ensured even when the electrical power fails.

SUMMARY OF THE INVENTION

The object is achieved with a transmission for coupling a starter-generator electrical machine with an internal combustion engine at a transmission ratio that is a function of the rotational speed of the internal combustion engine. The ratio of the rotational speed of the electrical machine to that of the internal combustion engine is greater at a low rotational speed of the internal combustion engine than at a high rotational speed of the internal combustion engine. A control device is provided for switching the transmission ratio. The control device is held by means of spring force in a condition at which the ratio of rotational speeds is high, and as the rotational speed of the internal combustion engine increases is switched to a condition at which the ratio of rotational speeds is lower.

In an advantageous embodiment of the transmission in accordance with the invention, an output shaft of the electrical machine is non-rotatably connected with the sun gear of a planetary gear train. An output shaft of the internal combustion engine is non-rotatably connected with a planet carrier that is coupled with the sun gear through a free wheeling mechanism, which makes it possible for the sun gear to turn at a higher rotational speed than the planet carrier. The planet gears are connected with a ring gear on which the control device acts.

Advantageously, the control device includes a brake acting on the ring gear, which is engaged by the force of a disk spring.

Preferably, the control device also includes a piston-and-cylinder unit that can be subjected to lubricating oil pressure from the internal combustion engine, by means of which unit the brake can be released against the force of the spring.

In a supply conduit to the piston-and-cylinder unit a valve can be situated, through which the piston-and-cylinder unit can optionally be connected to a conduit carrying lubricating oil from the internal combustion engine or to an unpressurized conduit.

The valve can be electrically operable, and can open automatically if the electrical power fails in order to connect the piston-and-cylinder unit with the conduit carrying lubricating oil from the internal combustion engine.

The spring can be designed as a generally disk-shaped diaphragm spring that acts against the brake with its radially outer periphery, that interacts with the piston of the piston-and-cylinder unit with its radially inner periphery, and that in an intermediate region bears against a ring bearing.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
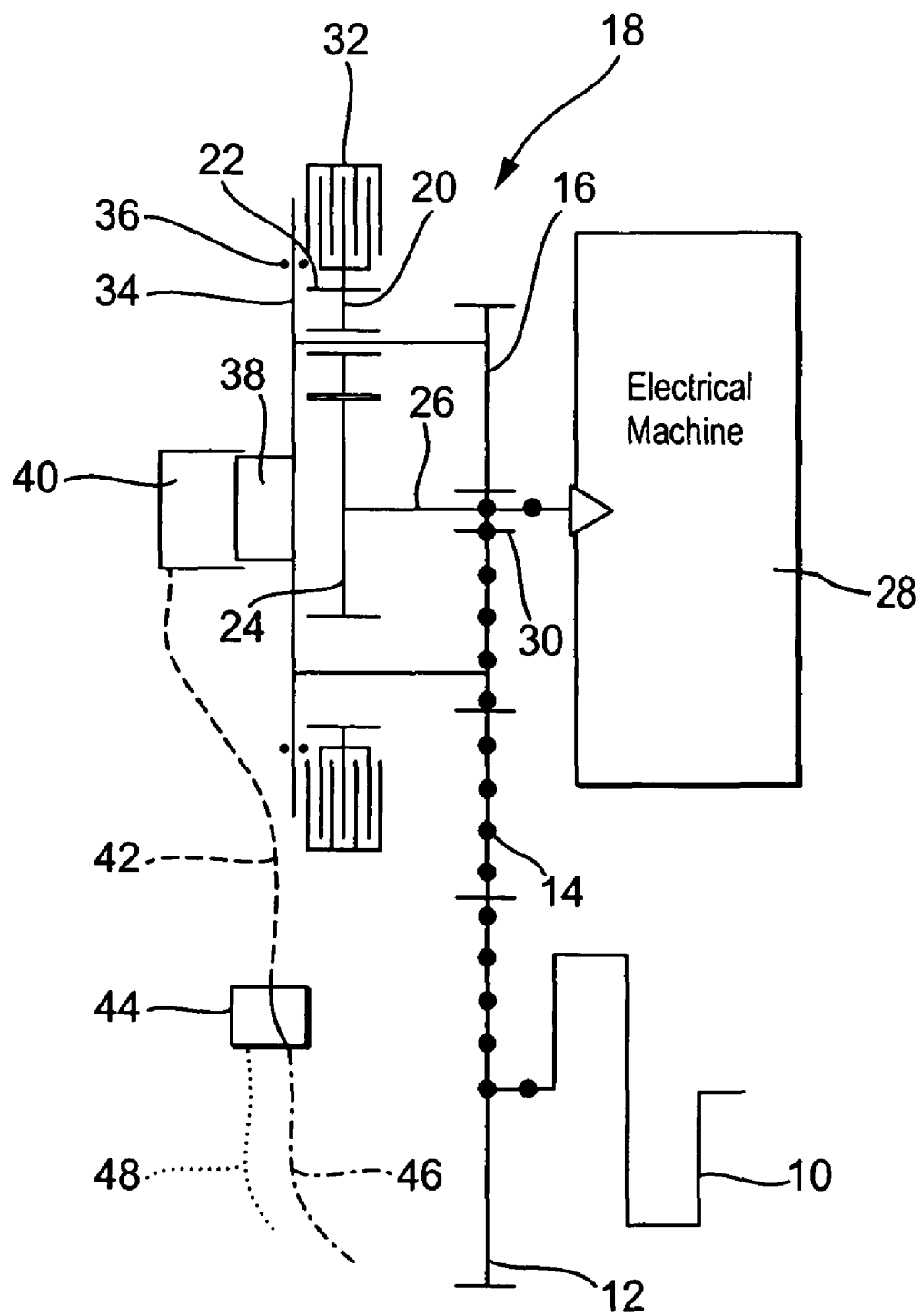
FIG. 1 is a schematic view of a transmission in accordance with the invention with the brake disengaged.
Figure 2:
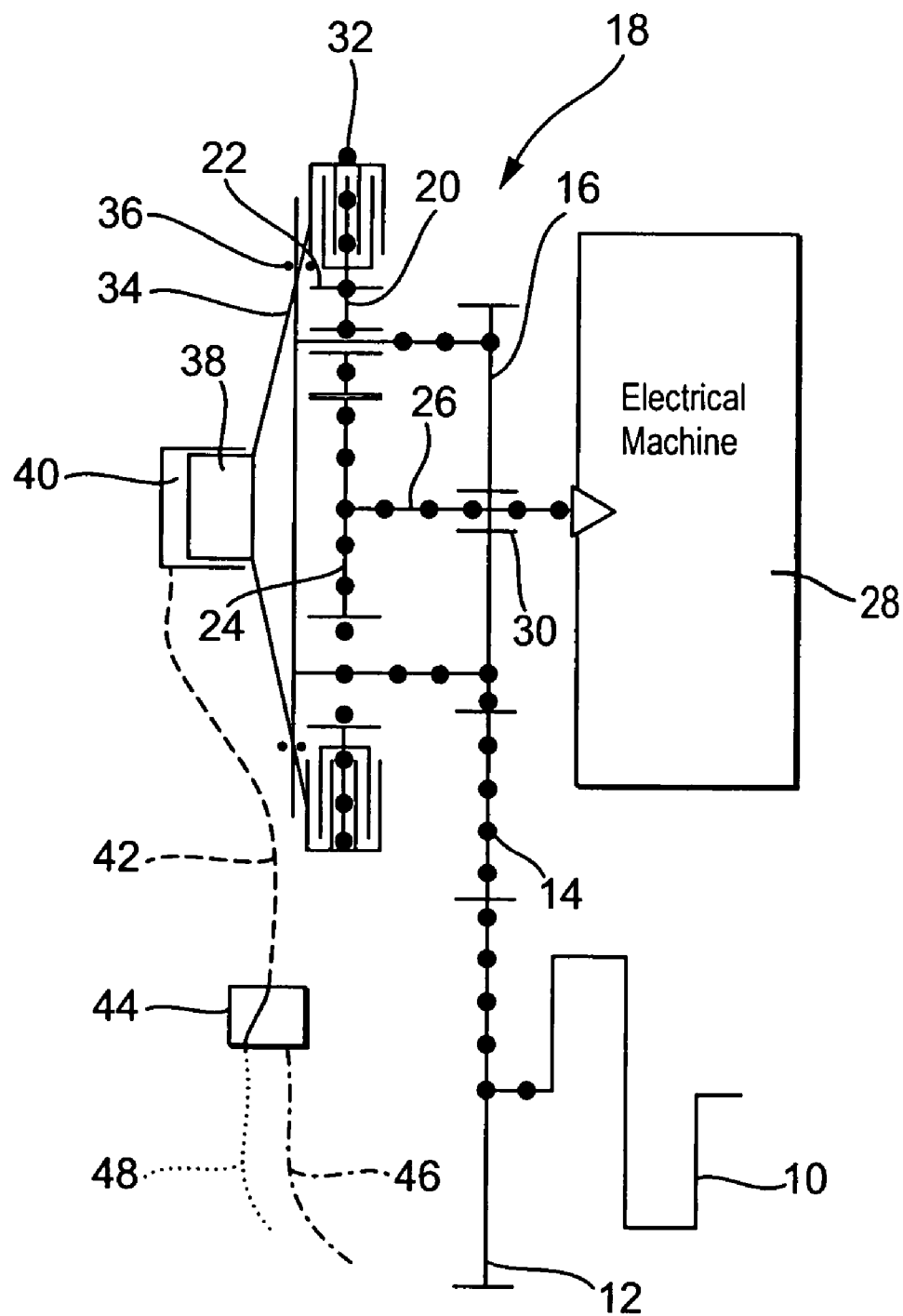
FIG. 2 is a view similar to that of FIG. 1 with the brake engaged.

As shown in FIGS. 1 and 2 of the drawings, a crankshaft 10 of an internal combustion engine (not shown) is non-rotatably connected with a gear 12 that is rotationally engaged with teeth of a planet carrier 16 through a toothed chain 14. Planet carrier 16 is part of with a planetary gear train that is designated collectively as 18.

Supported on the planet carrier 16 are planet gears 20 that mesh with the inner teeth of a ring gear 22 and with the outer teeth of a sun gear 24, which is non-rotatably connected with the output shaft 26 of an electrical machine 28 that is operable as a starter for the internal combustion engine and as a generator for a charging an electrical energy storage unit (not shown).

Situated between the output shaft 26 and the center of the planet carrier 16 is a freewheeling mechanism 30 through which the output shaft 26 passes.

The ring gear can be braked to a stop by means of a braking device 32, which is operable by means of a generally disk-shaped diaphragm spring 34, which bears against an annular ring bearing 36 that is fixed to the planetary gear train housing and is connected to a piston 38 that is movable within a cylinder 40.

The interior of cylinder 40 is connected via a conduit 42, shown as a dashed line, with a valve 44, by means of which conduit 42 can optionally be connected with a pressure conduit 46, represented as a dash-dot line, which is connected to the lubricating oil circuit of the internal combustion engine, or with a conduit 48, shown as a dotted line, which leads to the oil sump of the internal combustion engine, for example, and is non-pressurized.

Valve 44 is electrically operable in a way that is not shown, and is built so that it automatically connects conduits 42 and 46 if the electrical power fails.

The transmission ratios that can be set by the illustrated transmission are such that in the functional condition shown in FIG. 1, in which the brake 32 is released and thus the ring gear is freely rotatable, the planet carrier 16 turns at the same rotational speed as the crankshaft 10 (low transmission ratio). In that condition, the free wheeling mechanism 30 is inactive and the output shaft 26 of the electrical machine is rotationally driven by the planet carrier 16, so that with the torque transmission path shown in FIG. 1 as a thick dotted line electrical machine 8 rotates at the same rotational speed as the planet carrier 16 that is driven by the crankshaft 10 of the internal combustion engine.

In the functional condition in accordance with FIG. 2, brake 32 is engaged so that ring gear 22 is braked to a stop and stands still. Planetary gear train 18 is active and is transmitting torque from crankshaft 10 to electrical machine 28 via the transmission path that is again shown with thick dots, the rotational speed of sun gear 24, and hence of electrical machine 28, being about three times as great as that of crankshaft 10. Free wheeling mechanism 30 permits the higher rotational speed of output shaft 26 of electrical machine 28 relative to planet carrier 16.

The transmission of torque is possible in the two illustrated transmission ratios not only from crankshaft 10 to the output shaft of electrical machine 28, but in the same manner from electrical machine 28 to crankshaft 10.

The reliability concept that is possible with the invention will now be explained:

When the electrical power supply system is intact, the valve 44 can be controlled arbitrarily, so that the transmission ratio can be set optionally.

Figure 3:
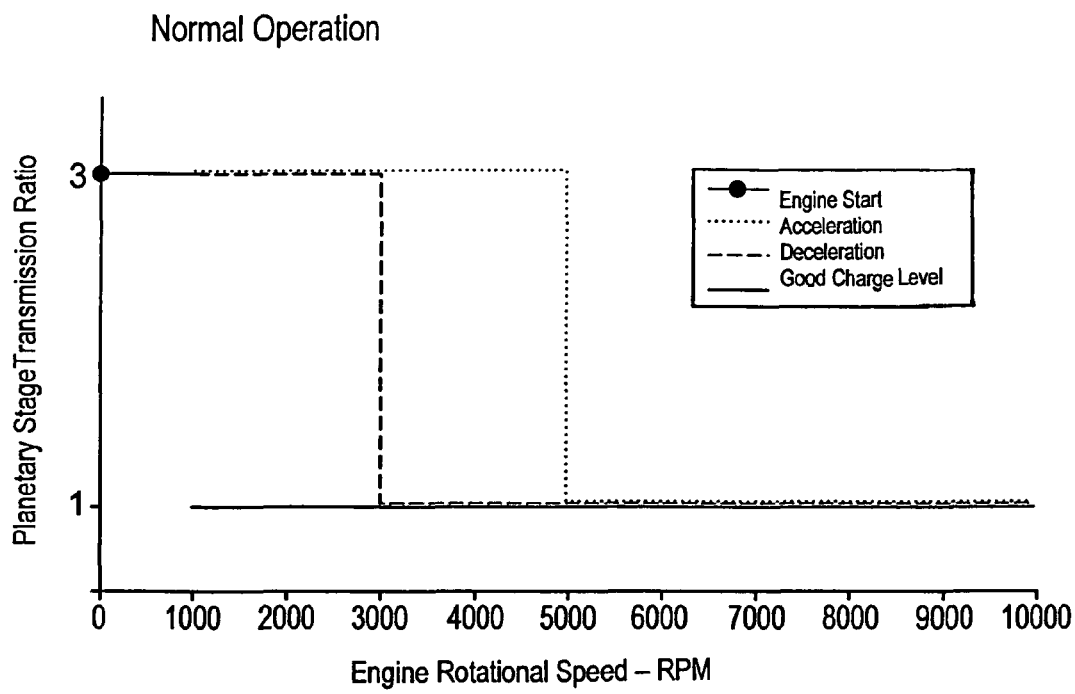
FIG. 3 is a graph showing the transmission ratio as a function of engine rotational speed for normal operation.

FIG. 3 shows normal driving operation, with the engine rotational speed being shown on the abscissa and the transmission ratio on the ordinate.

To start the engine (large dot) the system is operated at a high transmission ratio, i.e., with the brake applied.

As the vehicle accelerates (dotted line), the transmission ratio is switched at 5,000 rpm, by setting the condition in accordance with FIG. 1. When the vehicle decelerates (dashed line) below a rotational speed of 3,000 rpm and if the battery charge is low, the system operates at transmission ratio 3 (high transmission ratio), cylinder 40 being depressurized by setting valve 44 appropriately, and the brake being applied by the force of diaphragm spring 34.

When the battery is well charged, the system operates at a low transmission ratio in all rotational speed ranges of the engine.

Figure 4:
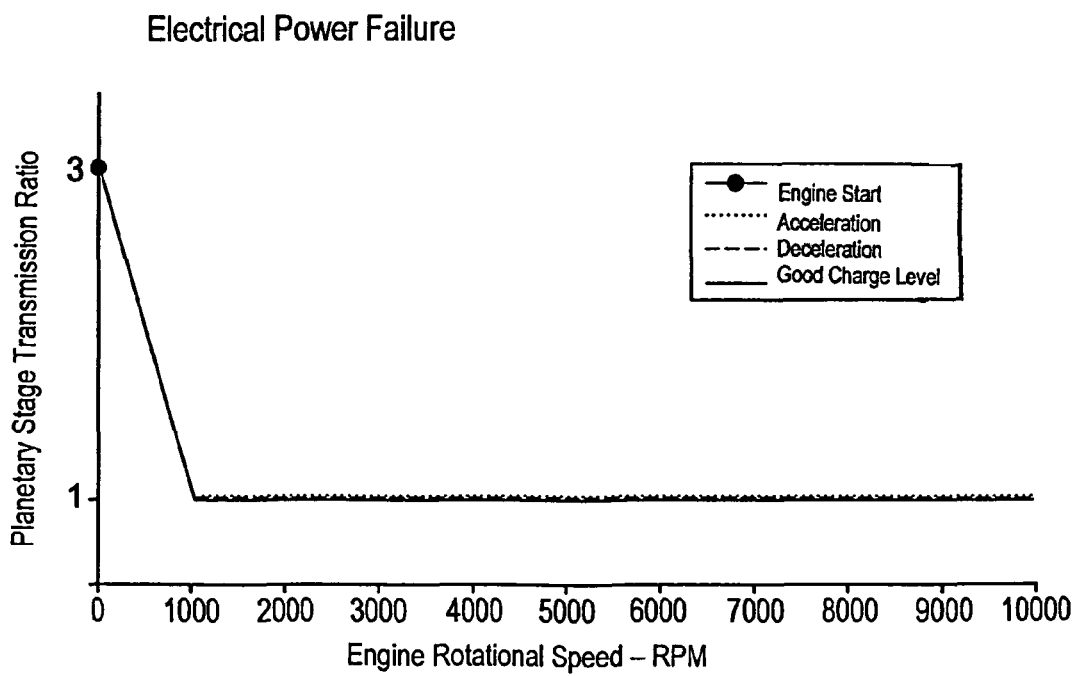
FIG. 4 is a graph showing the transmission ratio as a function of engine rotational speed during an electrical power failure.

FIG. 4 shows operation when the electrical power has failed, i.e., when valve 44 cannot be actively switched.

When the engine is started there is no engine lubricating oil pressure available, so that the brake is applied by the force of diaphragm spring 34 (FIG. 2). The system operates at a high transmission ratio to start the engine. When there is no electrical power, valve 44 is in the condition shown in FIG. 1, i.e., it connects pressure conduit 46 with cylinder 40, so that as the engine rotational speed increases pressure builds up in cylinder 40, which disengages brake 32 and switches to the low transmission ratio. In that way, electrical machine 28 is reliably protected from overspeeding.

The transmission and its control described as an example can be modified in many ways. For example, the transmission ratios are only examples and can be changed. Other switching points can also be chosen. The transmission and the operation of the brake can be designed in a great variety of ways, just as long as the functionalities characterized in the claims are achieved.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A transmission arrangement for coupling a starter-generator electrical machine with an internal combustion engine at a transmission ratio that is a function of the rotational speed of the internal combustion engine, said transmission arrangement comprising:

a transmission having a variable transmission ratio, wherein the ratio of a rotational speed of the electrical machine to that of the internal combustion engine is greater at a low rotational speed of the internal combustion engine than at a high rotational speed of the internal combustion engine, wherein the electrical machine includes an output shaft that is directly non-rotatably connected with a sun gear of a planetary gear train, an output shaft of the internal combustion engine is operatively connected with a planet carrier that is connected with the electrical machine output shaft through a freewheeling mechanism for enabling the sun gear to turn at a higher rotational speed than that of the planet carrier; and a control device for controlling the transmission by switching the transmission ratio, wherein the control device includes a spring and is held by means of spring force in a first condition in which the rotational speed ratio of the electrical machine to that of the internal combustion engine is a first rotational speed ratio, and as the rotational speed of the internal combustion engine increases the control device is switched to a second condition in which the rotational speed ratio is a second rotational speed ratio that is lower than the first rotational speed ratio, and wherein planet gears carried by the planet carrier mesh with a ring gear against which the control device acts to regulate ring gear rotational speed.

2. A transmission arrangement in accordance with claim 1, wherein the control device includes a brake that acts on the ring gear, and the brake is engaged by the force of the spring.

3. A transmission arrangement for coupling a starter-generator electrical machine with an internal combustion engine at a transmission ratio that is a function of the rotational speed of the internal combustion engine, said transmission arrangement comprising:
   a transmission having a variable transmission ratio, wherein the ratio of a rotational speed of the electrical machine to that of the internal combustion engine is greater at a low rotational speed of the internal combustion engine than at a high rotational speed of the internal combustion engine, wherein the electrical machine includes an output shaft that is non-rotatably connected with a sun gear of a planetary gear train; an output shaft of the internal combustion engine is non-rotatably connected with a planet carrier that is connected with the sun gear through a freewheeling mechanism for enabling the sun gear to turn at a higher rotational speed than that of the planet carrier, and wherein planet gears carried by the planet carrier mesh with a ring gear against which the control device acts to regulate ring gear rotational speed; and
   a control device for controlling the transmission by switching the transmission ratio, wherein the control device includes a spring and is held by means of spring force in a first condition in which the rotational speed ratio of the electrical machine to that of the internal combustion engine is a first rotational speed ratio, and as the rotational speed of the internal combustion engine increases the control device is switched to a second condition in which the rotational speed ratio is a second rotational speed ratio that is lower than the first rotational speed ratio, wherein the control device includes a brake that acts on the ring gear, and the brake is engaged by the force of the spring, and wherein the control device includes a piston-and-cylinder unit that is subjected to lubricating oil pressure from the internal combustion engine, for releasing the brake by acting on the brake against the force of the spring.

4. A transmission arrangement in accordance with claim 3, including a supply conduit connected to the piston-and-cylinder unit, and a valve positioned in the supply conduit and through which the piston-and-cylinder unit can selectively be connected to at least one of a conduit carrying lubricating oil from the internal combustion engine and to an unpressurized conduit.

5. A transmission arrangement in accordance with claim 4, wherein the valve is electrically operable and opens automatically upon failure of electrical power, and wherein the valve connects the piston-and-cylinder unit with the conduit carrying lubricating oil from the internal combustion engine.

6. A transmission arrangement in accordance with claim 3, wherein the spring is a disk spring that has a radially outer periphery that acts against the brake, and that has a radially inner periphery that acts on the piston of the piston-and-cylinder unit, and that has an intermediate region bears against a ring bearing.

7. A transmission arrangement in accordance with claim 3, wherein the spring is a disk spring that adjacent an outer periphery bears against a ring bearing, and that has a radially inner periphery that acts on the piston of the piston-and-cylinder unit, and that includes an intermediate region that acts against the brake.

8. A transmission arrangement in accordance with claim 1, wherein the spring is a diaphragm spring.

9. A transmission arrangement in accordance with claim 8, wherein the spring acts against the ring gear through an annular ring bearing.

* * * * *